US010912030B2

(12) United States Patent
Chhabra et al.

(10) Patent No.: US 10,912,030 B2
(45) Date of Patent: Feb. 2, 2021

(54) SELECTIVELY CONTROLLING TRANSMIT POWER FROM A RADIO ACCESS NETWORK (RAN) CELL TO USER EQUIPMENT (UE) IN CLOSED-LOOP POWER CONTROL FOR UPLINK CONTROL CHANNEL BASED ON VARIATION IN MEASURED UPLINK SIGNAL QUALITY

(71) Applicant: Corning Research & Development Corporation, Corning, NY (US)

(72) Inventors: Vandana Chhabra, Fremont, CA (US); Shirish Nagaraj, Pleasanton, CA (US); Farhan Aslam Qazi, San Jose, CA (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/293,950

(22) Filed: Mar. 6, 2019

(65) Prior Publication Data
US 2020/0288394 A1    Sep. 10, 2020

(51) Int. Cl.
*H04W 52/42* (2009.01)
*H04W 52/02* (2009.01)
*H04W 52/14* (2009.01)
*H04W 52/24* (2009.01)

(52) U.S. Cl.
CPC ..... *H04W 52/0216* (2013.01); *H04W 52/146* (2013.01); *H04W 52/241* (2013.01); *H04W 52/248* (2013.01)

(58) Field of Classification Search
CPC ............. H04W 52/146; H04W 52/241; H04W 52/246; H04W 52/383; H04W 52/346; H04W 52/42; H04W 72/0413; H04W 88/02
See application file for complete search history.

(56) References Cited

U.S. PATENT DOCUMENTS

| 5,604,766 | A  | 2/1997  | Dohi et al. |
| 7,657,275 | B2 | 2/2010  | Kasturi et al. |
| 8,077,662 | B2 | 12/2011 | Srinivasan et al. |
| 8,432,817 | B2 | 4/2013  | Majidi-Ahy et al. |

(Continued)

OTHER PUBLICATIONS

International Search Report and Written Opinion of the International Searching Authority; PCT/US2020/017682; dated May 14, 2020; 12 Pages; European Patent Office.

*Primary Examiner* — Phuc H Tran
(74) *Attorney, Agent, or Firm* — C. Keith Montgomery

(57) ABSTRACT

Selectively controlling transmit power from a radio access network (RAN) cell to user equipment (UE) in closed-loop power control for uplink control channel based on variation in measured uplink signal quality. To avoid the RAN cell continuously sending transmit power control messages that may not be effective in further adjusting transmit power of the UE, the RAN cell selectively controls transmit power of the UE based on effectiveness in such transmit power control changing uplink channel signal quality. The determined effectiveness of the transmit power control can be used by the RAN cell to determine when the next transmit power control message should be sent to the UE. The RAN cell can be configured to indirectly measure the uplink channel power by reviewing the received uplink channel quality in a report communicated from the UE to the RAN cell.

25 Claims, 6 Drawing Sheets

(56) References Cited

U.S. PATENT DOCUMENTS

| | | | |
|---|---|---|---|
| 8,934,403 B2 | 1/2015 | Larsson et al. | |
| 9,882,391 B2 | 1/2018 | Persson | |
| 10,433,261 B2 | 10/2019 | Hejazi et al. | |
| 2006/0013167 A1 | 1/2006 | Wheatley et al. | |
| 2010/0278530 A1 | 11/2010 | Kummetz et al. | |
| 2011/0244914 A1 | 10/2011 | Venkatraman et al. | |
| 2014/0334367 A1* | 11/2014 | Nakashima | H04W 52/42 370/311 |
| 2014/0376458 A1* | 12/2014 | Ryu | H04W 72/085 370/329 |
| 2018/0098357 A1* | 4/2018 | Rico Alvarino | H04L 5/0048 |

* cited by examiner $$P_{PUCCH}(i) = \min\{P_{CMAX}, \underbrace{P_{0\_PUCCH}}_{(1)} + \underbrace{PL + h(n_{CQI}, n_{HARQ})}_{(2)} + \underbrace{\Delta_{F\_PUCCH}(F)}_{(3)} + \underbrace{g(i)}_{(4)}\} \; [dBm]$$

(1) $P_{0\_PUCCH}(i)$: A PARAMETER COMPOSED OF THE SUM OF A CELL SPECIFIC NOMINAL COMPONENT $P_{0\_NOMINAL\_PUCCH}(i)$ AND A UE SPECIFIC COMPONENT $P_{0\_UE\_PUCCH}(i)$ PROVIDED BY HIGHER LAYERS (2) $PL$: THE DOWNLINK PATH LOSS ESTIMATE CALCULATED IN THE UE IN dB (2) $h(n_{CQI}, n_{HARQ})$: A PUCCH FORMAT DEPENDENT VALUE, WHERE $n_{CQI}$ CORRESPONDS TO THE NUMBER OF INFORMATION BITS FOR THE CHANNEL QUALITY INFORMATION AND $n_{HARQ}$ IS THE NUMBER OF HARQ BITS (3) $\Delta_{F\_PUCCH}(F)$: A VALUE CORRESPONDS TO A PUCCH FORMAT (F) RELATIVE TO PUCCH FORMAT 1a (4) $g(i)$: THE TERM REFLECTS TPC $$g(i) = g(i-1) + \sum_{m=0}^{M-1} \delta_{PUCCH}(i - k_m) \quad \ldots M=1, k_0 = 4 \text{ FOR FDD}$$

FIG. 4

SELECTIVELY CONTROLLING TRANSMIT POWER FROM A RADIO ACCESS NETWORK (RAN) CELL TO USER EQUIPMENT (UE) IN CLOSED-LOOP POWER CONTROL FOR UPLINK CONTROL CHANNEL BASED ON VARIATION IN MEASURED UPLINK SIGNAL QUALITY

BACKGROUND

The disclosure relates generally to mobile communications systems and related networks, such as Universal Mobile Telecommunications Systems (UMTSs), its offspring Long Term Evolution (LTE) and 5th Generation New Radio (5G-NR) described and being developed by the Third Generation Partnership Project (3GPP), and more particularly to selectively controlling transmit power from a radio access network (RAN) cell to user equipment (UE) in closed-loop power control for uplink control channel based on variation in measured uplink signal quality.

Operators of mobile systems, such as UMTS and its offspring including LTE and LTE-Advanced, are increasingly relying on wireless small cell RANs in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB). The eNB communicates signaling and data information in a downlink direction to user equipment in communication range of the eNB. A UE communicates signaling and data information in an uplink direction back to the eNB.

It is desired that the signal-to-noise ratio (SNR) or signal-to-interference plus noise ratio (SINR) of uplink communications signals received by the eNB as transmitted by the UE be of a certain level to provide the desired quality level of communications. In LTE for example, a data channel called a physical uplink data channel (PUSCH) is supported that is used to carry uplink data information from the UE to the eNB. Also in LTE as an example, a signaling channel called a physical uplink control channel (PUCCH) is supported that is used to carry uplink control information (UCI) from the UE to the eNB. Closed-loop power control (CLPC) can be implemented by the eNB to adapt the transmit power and throughput of the UE based on determining the channel link quality of the PUSCH and PUCCH. Power control of the PUCCH causes the UE to adjust its transmit power to compensate for channel fading, reduce inter-cell interference, and maximize throughput. The PUCCH supports UCI that allows the UE to indicate the channel quality between the eNB and the UE based on downlink communications signals received by the UE from the eNB. The UCI is divided into branches, one of which includes a channel quality indication (CQI) report. Thus, the CQI report communicated on the PUCCH can inform the eNB about the downlink channel quality that is being observed by the UE. The eNB can determine the difference between the measured SNR or SINR in periodically received CQI reports for a UE and a PUCCH target SNR or SINR to determine if the transmit power should be increased or decreased in the UE. The eNB can then implement closed-loop power control (CLPC) for the PUCCH to achieve PUCCH-specific target SNR or SINR at the eNB by sending transmit power control (TPC) commands to the UE. The TPC commands received by the UE cause the UE to adjust its transmit gain such that the eNB controls the PUCCH power in a closed-loop process. The TPC commands to be sent by the eNB to the UE to adjust PUCCH power are determined by the eNB based on the difference between measured SNR or SINR of periodic CQI reports received from the UE on the PUCCH and a desired PUCCH-specific target SNR or SINR. These TPC commands should ideally be sent in downlink control information (DCI) format for downlink grants transmitted by the eNB, even when UE has no downlink data, so that the eNB can receive the periodic CQI reports with a high level of reliability.

CLPC for PUCCH can interfere with the connected mode Discontinuous Reception (DRX) feature for the UE which would otherwise help conserve battery life of the UE. In LTE, DRX involves the UE periodically waking up and monitoring a physical downlink control channel (PDCCH) in a signaling idle state (e.g., RRC_Idle in radio resource control (RRH) signaling) to listen to the paging message to know about incoming calls, system information change, and Earthquake and Tsunami Warg Service (ETWS) notification, for example, only at predetermined period (e.g., every 60 milliseconds (ms) or 100 ms) to reduce UE's power consumption. Thus, in CLPC, when a UE is at maximum or minimum PUCCH power, and the PUCCH-specific target SNR or SINR is still not met, the eNB may still keep sending TPC commands to the UE to reduce or increase PUCCH transmit power, thus causing the UE to consume additional power, and if powered by a battery, run down its battery.

No admission is made that any reference cited herein constitutes prior art. Applicant expressly reserves the right to challenge the accuracy and pertinency of any cited documents.

SUMMARY

Embodiments of the disclosure relate to selectively controlling transmit power from a radio access network (RAN) cell to user equipment (UE) in closed-loop power control for uplink control channel based on variation in uplink signal quality. A RAN is configured to service mobile communications between a servicing RAN cell and UE. The servicing cell may be an eNodeB (eNB) base station for example. The UE may be a mobile communications device, such as a cellular phone for example. The RAN cell is configured to establish a communications session with a UE that includes a downlink control channel for controlling downlink communications from the RAN cell to the UE over a downlink data channel. The communications session also includes establishing an uplink control channel for controlling uplink communications over an uplink data channel from the UE to the RAN cell. To achieve a specific target signal quality (e.g., signal-to-noise ratio (SNR) or signal-to-interference noise ratio (SINR)) for the uplink control channel, the RAN cell sends power control commands to the UE to adjust its transmit power based on uplink signal quality. In this manner, the RAN cell controls the uplink transmit power for the uplink control channel in a closed-loop manner. If the UE is at maximum or minimum uplink control channel power, then sending transmit power control messages to the UE to either increase or decrease, respectively, the uplink control channel power will not be effective. However, these ineffective transmit power control messages would still cause UE to unnecessarily consume power in receiving and processing such transmit power control messages.

Thus, in exemplary aspects disclosed herein, to avoid the RAN cell continuously sending transmit power control messages that may not be effective in further adjusting the transmit power of the UE, aspects disclosed herein include the RAN cell selectively controlling transmit power of the UE (e.g., through selective communication of transmit power control messages) based on the effectiveness in such transmit power control changing the uplink channel signal quality (e.g., uplink channel control quality). The RAN cell can determine the effectiveness of the transmit power control by tracking communicated transmit power control messages sent to the UE, measuring the uplink channel power, and determining how this power changes or does not change based on communicated transmit power control messages. For example, if the uplink channel power is at a maximum or minimum power level, sending further transmit power control messages to increase or decrease, respectively, the uplink channel power will not be effective. The determined effectiveness of the transmit power control messages can be used by the RAN cell to determine when the next transmit power control message should be sent to the UE. In this manner, sending transmit power control messages can be avoided if not effective to conserve processing power in the UE by receiving and processing such commands. The RAN cell can be configured to directly calculate receive power to directly measure the uplink channel power, but such may involve complex and time-consuming calculations. In examples disclosed herein, the RAN cell can be configured to indirectly measure the uplink channel power by reviewing the received uplink channel quality (e.g., SNR or SINR) in a report communicated from the UE to the RAN cell.

In one exemplary aspect of the disclosure, a RAN cell is provided. The RAN cell comprises a transmitter circuit configured to transmit a communications signal on a downlink channel to a UE. The RAN cell also comprises a receiver circuit configured to receive communications signals on an uplink channel from a UE. The RAN cell also comprises a controller circuit communicatively coupled to the transmitter circuit and the receiver circuit. The controller circuit is configured to receive on the uplink channel, a downlink channel quality of the downlink channel measured by a UE, and measure an uplink channel quality of the uplink channel based on the received downlink channel quality. The controller circuit is also configured to, in response to the measured uplink channel quality being less than a target uplink channel quality, create a transmit power control message comprising a power adjustment indicator to be sent to the UE to adjust its transmit power based on the power adjustment indicator, and store the sent transmit power control message and the measured uplink channel quality corresponding to the sent transmit power control message. The controller circuit is also configured to determine if a number of stored sent transmit power control messages having a corresponding power adjustment factor greater than a defined power adjustment threshold exceeds a defined transmit power control message number threshold. The controller circuit is also configured to, in response to the number of stored sent transmit power control messages having the corresponding power adjustment factor greater than the defined power adjustment threshold exceeding the defined transmit power control message number threshold, determine a variance in the uplink channel quality of the uplink channel based on the measured uplink channel quality, and determine if the variance in the uplink channel quality of the uplink channel exceeds a defined uplink channel quality variance threshold. The controller circuit is also configured to, in response to the variance in the uplink channel quality of the uplink channel not exceeding the defined uplink channel quality variance threshold, not send the transmit power control message to the UE.

An additional embodiment of the disclosure relates to a method of controlling transmit power of UE in communication with a RAN cell. The method comprises receiving on an uplink channel, a downlink channel quality of a downlink channel measured by a UE, and measuring an uplink channel quality of uplink channel based on the received downlink channel quality. The method also comprises, in response to the measured uplink channel quality being less than a target uplink channel quality, creating a transmit power control message comprising a power adjustment indicator to be sent to the UE to adjust its transmit power based on the power adjustment indicator, and storing the sent transmit power control message and the measured uplink channel quality corresponding to the sent transmit power control message. The method also comprises determining if a number of stored sent transmit power control messages having a corresponding power adjustment factor greater than a defined power adjustment threshold exceeds a defined transmit power control message number threshold. The method also comprises in response to the number of stored sent transmit power control messages having the corresponding power adjustment factor greater than the defined power adjustment threshold exceeding the defined transmit power control message number threshold, determining a variance in the uplink channel quality of the uplink channel based on the measured uplink channel quality, and determining if the variance in the uplink channel quality of the uplink channel exceeds a defined uplink channel quality variance threshold. The method also comprises in response to the variance in the uplink channel quality of the uplink channel not exceeding the defined uplink channel quality variance threshold, not sending the transmit power control message to the UE.

An additional embodiment of the disclosure relates to a non-transitory computer-readable medium having stored thereon computer executable instructions which, when executed, cause a processor associated with a RAN cell to receive on an uplink channel, a downlink channel quality of a downlink channel measured by a UE, and measure an uplink channel quality of the uplink channel based on the received downlink quality. The non-transitory computer-readable medium having stored thereon computer executable instructions which, when executed, further cause the processor associated with the RAN cell to, in response to the measured uplink channel quality being less than a target uplink channel quality, create a transmit power control message comprising a power adjustment indicator to be sent to the UE to adjust its transmit power based on the power adjustment indicator, and store the sent transmit power control message and the measured uplink channel quality corresponding to the sent transmit power control message. The non-transitory computer-readable medium having stored thereon computer executable instructions which, when executed, further cause the processor associated with the RAN cell to determine if a number of stored sent transmit power control messages having a corresponding power adjustment factor greater than a defined power adjustment threshold exceeds a defined transmit power control message number threshold. The non-transitory computer-readable medium having stored thereon computer executable instructions which, when executed, further cause the processor associated with the RAN cell to, in response to the number of stored sent transmit power control messages having the corresponding power adjustment factor greater than the defined power adjustment threshold exceeding the defined transmit power control message number threshold, determine a variance in the uplink channel quality of the uplink channel based on the measured uplink channel quality, determine if the variance in uplink channel quality of the uplink channel exceeds a defined uplink channel quality variance threshold, and in response to the variance in the uplink channel quality of the uplink channel not exceeding the defined uplink channel quality variance threshold, not send the transmit power control message to the UE.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4 illustrates an exemplary calculation of power for a physical uplink channel control (PUCCH) in LTE;

DETAILED DESCRIPTION

Figure 1:
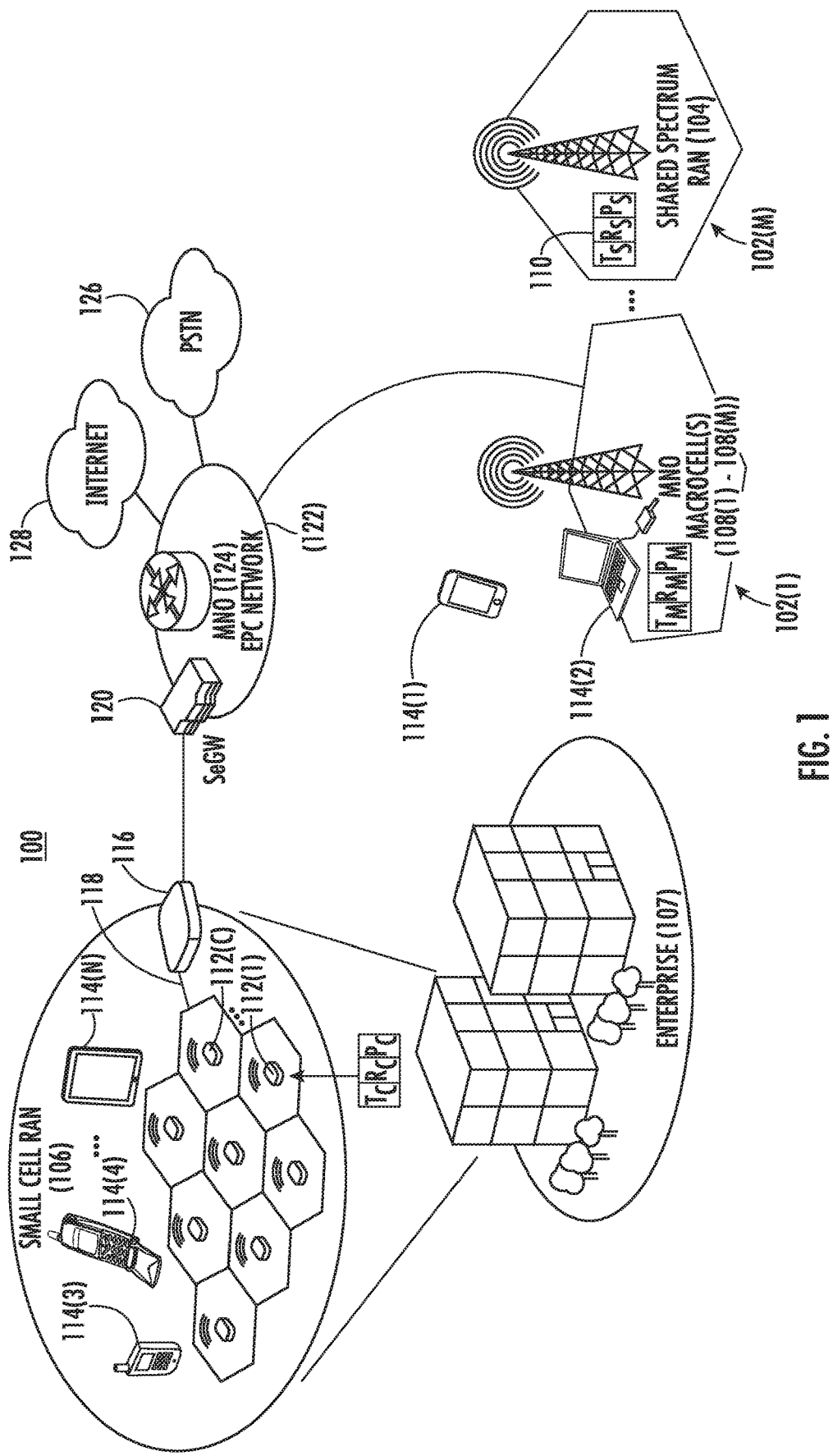
FIG. 1 is a schematic diagram of an exemplary mobile telecommunications environment that includes an exemplary macrocell radio access network (RAN) and an exemplary small cell RAN located within an enterprise environment and configured to service mobile communications between a user equipment (UE) to a mobile network operator (MNO), wherein a RAN cell in the environment is configured to selectively control transmit power from a radio access network (RAN) cell to UE in closed-loop power control for an uplink channel (e.g., uplink control channel) based on variation in uplink signal quality.

Embodiments of the disclosure relate to selectively controlling transmit power from a radio access network (RAN) cell to user equipment (UE) in closed-loop power control for uplink control channel based on variation in uplink signal quality. A RAN is configured to service mobile communications between a servicing RAN cell and UE. The servicing cell may be an eNodeB (eNB) base station for example. The UE may be a mobile communications device, such as a cellular phone for example. The RAN cell is configured to establish a communications session with a UE that includes a downlink control channel for controlling downlink communications from the RAN cell to the UE over a downlink data channel. The communications session also includes establishing an uplink control channel for controlling uplink communications over an uplink data channel from the UE to the RAN cell. To achieve a specific target signal quality (e.g., signal-to-noise ratio (SNR) or signal-to-interference noise ratio (SINR)) for the uplink control channel, the RAN cell sends power control commands to the UE to adjust its transmit power based on uplink signal quality. In this manner, the RAN cell controls the uplink transmit power for the uplink control channel in a closed-loop manner. If the UE is at maximum or minimum uplink control channel power, then sending transmit power control messages to the UE to either increase or decrease, respectively, the uplink control channel power will not be effective. However, these ineffective transmit power control messages would still cause UE to unnecessarily consume power in receiving and processing such transmit power control messages.

Thus, in exemplary aspects disclosed herein, to avoid the RAN cell continuously sending transmit power control messages that may not be effective in further adjusting the transmit power of the UE, aspects disclosed herein include the RAN cell selectively controlling transmit power of the UE (e.g., through selective communication of transmit power control messages) based on the effectiveness in such transmit power control changing the uplink channel signal quality (e.g., uplink channel control quality). The RAN cell can determine the effectiveness of the transmit power control by tracking communicated transmit power control messages sent to the UE, measuring the uplink channel power, and determining how this power changes or does not change based on communicated transmit power control messages. For example, if the uplink channel power is at a maximum or minimum power level, sending further transmit power control messages to increase or decrease, respectively, the uplink channel power will not be effective. The determined effectiveness of the transmit power control messages can be used by the RAN cell to determine when the next transmit power control message should be sent to the UE. In this manner, sending transmit power control messages can be avoided if not effective to conserve processing power in the UE by receiving and processing such commands. The RAN cell can be configured to directly calculate receive power to directly measure the uplink channel power, but such may involve complex and time-consuming calculations. In examples disclosed herein, the RAN cell can be configured to indirectly measure the uplink channel power by reviewing the received uplink channel quality (e.g., SNR or SINR) in a report communicated from the UE to the RAN cell.

In this regard, FIG. 1 is a schematic diagram of an exemplary mobile telecommunications environment 100 (also referred to as "environment 100") in which a RAN cell(s) can be provided and configured to selectively control transmit power of a UE based on the effectiveness in such transmit power control changing the uplink control channel signal quality. Before discussing examples of a RAN cell selectively controlling transmit power of a UE based on the effectiveness in such transmit power control changing the uplink control channel signal quality, the exemplary environment 100 in which RANs that include RAN cells is shown and described with regard to FIGS. 1 and 2.

As shown in FIG. 1, the environment 100 includes an exemplary macrocell radio access networks (RANs) 102(1)-102(M), a shared spectrum RAN 104, and an exemplary small cell RAN 106 located within an enterprise environment 107. The macrocell RANs 102(1)-102(M), the shared spectrum RAN 104, and small cell RAN 106 each include respective mobile network operator (MNO) macrocells 108(1)-108(M), shared spectrum cell 110, and small RAN cells 112(1)-112(C). The mobile telecommunications environment 100 and its macrocell RANs 102(1)-102(M), the shared spectrum RAN 104, and small cell RAN 106 are configured to service mobile communications with a UE 114(1)-114(N). The UEs 114(1)-114(N) may be mobile UEs (e.g., cellular phones or mobile devices) that can communicate wirelessly.

With continuing reference to FIG. 1, the macrocell RANs 102(1)-102(M) each include respective MNO macrocells 108(1)-108(N) that include a transmitter circuit $T_M$ for transmitting communications signals on a downlink channel to a UE 114(1)-114(N), a receiver circuit $R_M$ for receiving communications signals on an uplink channel from a UE 114(1)-114(N), and a controller circuit $P_M$ (e.g., a processor circuit, microprocessor, micro-controller, other control circuit) coupled to the transmitter circuit $T_M$ and receiver circuit $R_M$. The controller circuit $P_M$ processes information and data to be provided in transmitted communications signals and received in received communications signals. The UEs 114(1)-114(N) may be mobile UEs (e.g., cellular phones or mobile devices) that can communicate wirelessly. The MNO macrocells 108(1)-108(N) are configured to service mobile communications with a UE 114(1)-114(N) to a MNO. The shared spectrum RAN 104 includes the shared spectrum cell 110 that includes a transmitter circuit $T_S$ for transmitting shared spectrum communications signals, a receiver circuit $R_S$ for receiving shared spectrum communications signals, and a controller circuit $P_S$ (e.g., a processor circuit, a microprocessor, micro-controller, other control circuit) coupled to the transmitter circuit $T_S$ and receiver circuit $R_S$. The controller circuit $P_S$ processes information and data to be provided in transmitted shared spectrum communications signals and received in received shared spectrum communication signals. The shared spectrum cell 110 supports communications on frequencies that are not solely licensed to a particular MNO, and thus may service UE 114(1)-114(N), which are communications devices, independent of a particular MNO. For example, the shared spectrum RAN 104 may be operated by a third party that is not an MNO, and wherein the shared spectrum RAN 104 support citizens broadband radio service (CBRS) or unlicensed spectrum. The MNO macrocells 108(1)-108(N) in this example support communications on frequencies that are not licensed to a particular MNO. The small cell RAN 106 includes a plurality of the small RAN cells 112(1)-112(C) that each include a transmitter circuit Tc for transmitting communications signals, a receiver circuit Rc for receiving communications signals, and a controller circuit Pc (e.g., a microprocessor, micro-controller, other control circuit) coupled to the transmitter circuit Tc and receiver circuit Rc. The controller circuit Pc processes information and data to be provided in transmitted communications signals and received in received communication signals.

When a MNO macrocell 108(1)-108(M), shared spectrum cell 110, or small RAN cell 112(1)-112(C) services communications with a UE 114(1)-114(N), such MNO macrocell 108(1)-108(M), shared spectrum cell 110, or small RAN cell 112(1)-112(C) is considered a "serving RAN cell." A serving RAN cell for a UE 114(1)-114(N) is a RAN or cell in the RAN in which the UE 114(1)-114(N) have an established communications session with the exchange of mobile communications signals for mobile communications. For example, the UEs 114(3)-114(N) in FIG. 1 are being serviced by the small cell RAN 106, whereas UEs 114(1), 114(2) are being serviced by the MNO macrocells 108(1)-108(M).

With continuing reference to FIG. 1, the mobile telecommunications environment 100 in this example is arranged as a Long Term Evolution (LTE) system as described by the Third Generation Partnership Project (3GPP) as an evolution of the standards Global System for Mobile communication/Universal Mobile Telecommunications System (GSM/UMTS). It is emphasized, however, that the aspects described herein may also be applicable to other network types and protocols. The mobile telecommunications environment 100 includes the enterprise 107 in which the small cell RAN 106 is implemented. The small cell RAN 106 includes the plurality of small RAN cells 112(1)-112(C). Each small RAN cell 112(1)-112(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated. The number of cells deployed in the small RAN cells RAN 112(1)-112(C) deployed in the small cell RAN 106 may vary.

In FIG. 1, the small cell RAN 106 includes one or more services nodes (represented as a single services node 116 in FIG. 1) that manage and control the small RAN cells 112(1)-112(C). In alternative implementations, the management and control functionality may be incorporated into a radio node, distributed among nodes, or implemented remotely (i.e., using infrastructure external to the small cell RAN 106). The small RAN cells 112(1)-112(C) are coupled to the services node 116 over a direct or local area network (LAN) connection 118, as an example, typically using secure IPSec tunnels. The services node 116 aggregates voice and data traffic from the small RAN cells 112(1)-112(C) and provides connectivity over an IPSec tunnel to a security gateway (SeGW) 120 in an Evolved Packet Core (EPC) network 122 of an MNO EPC network 124. The EPC network 122 is typically configured to communicate with a public switched telephone network (PSTN) 126 to carry circuit-switched traffic, as well as for communicating with an external packet-switched network such as the Internet 128.

The radio coverage area of the MNO macrocell 108(1)-108(M) and shared spectrum cell 110 is typically much larger than that of a small RAN cell 112(1)-112(C), where the extent of coverage often depends on the base station configuration and surrounding geography. Thus, a given UE 114(3)-114(N) may achieve connectivity to MNO EPC network 124 through either a MNO macrocell 108(1)-108(M) in the macrocell RAN 102, the shared spectrum cell 110 in the shared spectrum RAN 104, or small RAN cell 112(1)-112(C) in the small cell RAN 106 in the environment 100.

Figure 2:
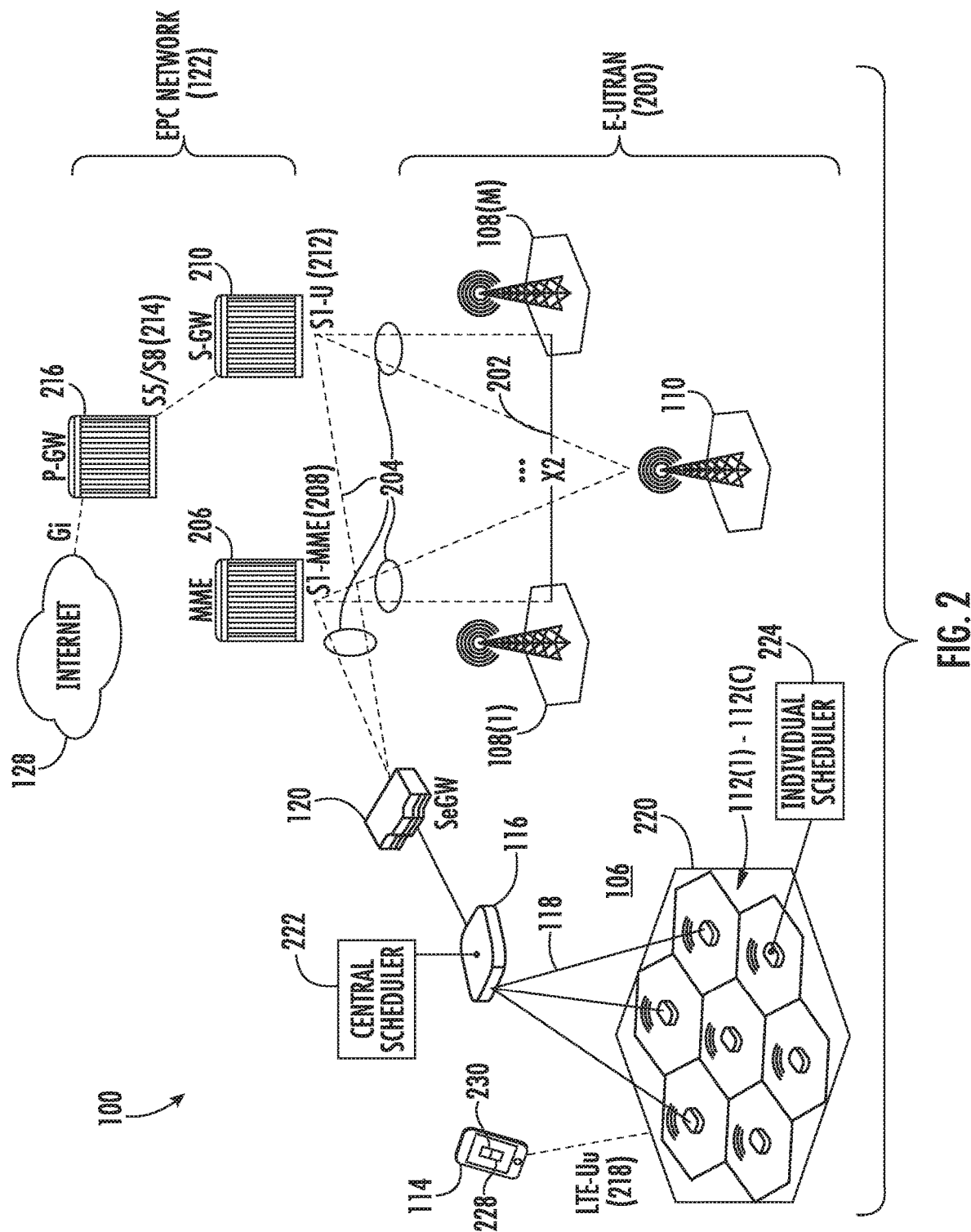
FIG. 2 illustrates exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 1.

With reference back to FIG. 1, the MNO macrocells 108(1)-108(M), the shared spectrum cell 110, and the small RAN cells 112(1)-112(C) may be neighboring radio access systems to each other, meaning that some or all can be in proximity to each other such that a UE 114(3)-114(N) may be able to be in communications range of two or more of the MNO macrocells 108(1)-108(M), the shared spectrum cell 110, and the small RAN cells 112(1)-112(C), depending on the location of UEs 114(3)-114 (N). If a UE 114(1)-114(N) serviced by the small RAN cell 112(1)-112(C) as a source RAN cell moves into the communication coverage area of a neighboring MNO macrocell 108(1)-108(M), the source RAN cell, by detecting a weaker communications signal from the UE 114(1)-114(N), initiates a handover command to the neighboring MNO macrocell 108(1)-108(M) as a "target RAN." The small cell RAN 106 may be aware of the Evolved universal terrestrial radio access (E-UTRA) Absolute Radio Frequency Channel Number (EARFCN) of the MNO macrocells 108(1)-108(M) as part of its configuration or an Automatic Neighbor Relation (ANR) discovery process. Similarly, if a UE 114(1)-114(N), serviced by the shared spectrum cell 110 as a source RAN, moves into the communication coverage area of a neighboring MNO macrocell 108(1)-108(M), the source RAN initiates a handover command to the neighboring MNO macrocell 108(1)-108 (M) as a "target RAN." The target RAN has a target coverage area overlapping a source coverage area of the source RAN cell in this example. The shared spectrum cell 110 may be aware of the EARFCN of the MNO macrocells 108(1)-108(M) as part of its configuration or an ANR process discussed above. Along with macrocell RANs 102(1)-102(M), the small cell RAN 106 forms an access network (i.e., an Evolved UMTS Terrestrial Radio Access Network (E-UTRAN)) under 3GPP as represented by reference numeral 200 in FIG. 2. As shown in FIG. 2, there is no centralized controller in the E-UTRAN 200, hence an LTE network architecture is commonly said to be "flat." MNO macrocells 108(1)-108(M) are typically interconnected using an X2 interface 202. The shared spectrum cell 110 may or may not be interconnected to the MNO macrocells 108(1)-108(M) through the X2 interface 202. The MNO macrocells 108(1)-108(M) and shared spectrum cell 110 are also typically connected to the EPC network 122 by means of an S1 interface 204. More particularly, the MNO macrocells 108(1)-108(M) and the shared spectrum cell 110 are connected to a Mobility Management Entity (MME) 206 in the EPC network 122 using an S1-MME interface 208, and to a Serving Gateway (S-GW) 210 using an S1-U interface 212. An S5/S8 interface 214 couples the S-GW 210 to a Packet Data Network Gateway (P-GW) 216 in the EPC network 122 to provide a UE 114 with connectivity to the Internet 128. The UE 114 can connect to the small RAN cells 112(1)-112(C) in the small cell RAN 106 over an LTE-Uu interface 218.

As shown in FIG. 2, the S1-MME interface 208 is also connected to the MME 206 and S-GW 210 in the EPC network 122 using the appropriate S1 interface connections 204. Accordingly, as each of the small RAN cells 112(1)-112(C) in the small cell RAN 106 are operatively coupled to the services node 116 over the LAN connection 118, the communications connections from the small RAN cells 112(1)-112(C) are aggregated to the EPC network 122. Such aggregation preserves the flat characteristics of the LTE network while reducing the number of S1 interface connections 204 that would otherwise be presented to the EPC network 122. Thus, the small cell RAN 106 essentially appears as a single eNB 220 to the EPC network 122, as shown. The services node 116 in the small cell RAN 106 includes a central scheduler 222. The small RAN cells 112(1)-112(C) may also be configured to support individual schedulers 224.

The UE 114 includes a radio transceiver 228, which in some embodiments may be configured according to the LTE specifications. In this case, the RAN cell, which may be the MNO macrocells 108(1)-108(M), the shared spectrum cell 110, and/or the small RAN cells 112(1)-112(C) may be configured to operate according to LTE specifications. The UE 114 includes a controller circuit 230 (e.g., a processor circuit, a microprocessor, a micro-controller, or a control circuit) that can include the processing of scheduling grant information and transmit power control (TPC) commands received from an MNO macrocell 108(1)-108(M), shared spectrum cell 110, and/or the small RAN cells 112(1)-112 (C), to control the UE's 114 power output settings for transmissions to such cell. The closed-loop power control mechanism for LTE is provided in "Evolved Universal Terrestrial Radio Access (E-UTRA); Physical layer procedures," 3GPP TS 36.213, v. 8.1.0, dated Dec. 12, 2007, the contents of which are incorporated herein by reference. Closed-loop power control is the capability of the UE 114 to adjust the uplink transmit power in accordance with the closed-loop correction value also known as TPC commands or messages. In this regard, the controller circuit 230 of the UE 114 may be configured in some embodiments to adjust an accumulated power control value in response to each TPC command received from a cell that directs a negative adjustment in transmit power, i.e., "DOWN" TPC commands, but to adjust the accumulated power control value in response to each TPC command that directs a positive adjustment in transmit power ("UP" TPC commands) only if a provisional power setting calculated from one or more radio link parameters and the unadjusted accumulated power control value indicates that the mobile terminal is not power limited. The controller circuit 230 of the UE 114 is further configured to calculate transmit power settings for each transmission based on the accumulated power control value and the one or more radio link parameters.

Figure 3:
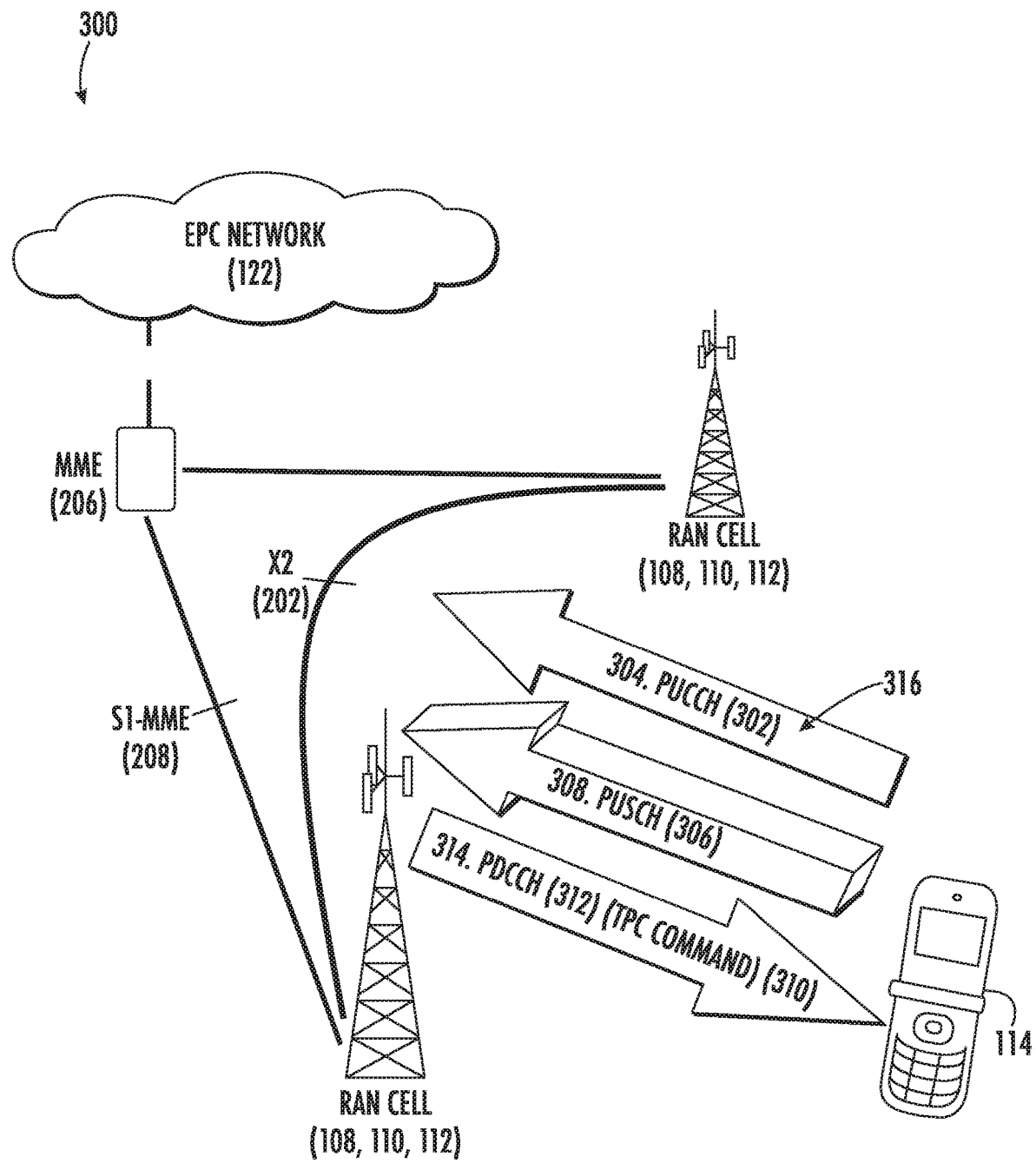
FIG. 3 is a flow diagram illustrating an exemplary process of a UE establishing communications with a RAN cell and a closed-loop power control process of the RAN cell sending transmit power control messages to the UE based on the uplink control channel signal quality to control uplink channel power.

FIG. 3 is a flow diagram 300 illustrating an exemplary process of a UE 114 establishing communications with a RAN cell 108, 110, 112, and a closed-loop power control process of a serving RAN cell 108, 110, 112 sending transmit power control to the UE 114 based on the uplink control channel signal quality to control uplink control channel power. The example in FIG. 3 is for closed-loop power control in LTE, but such is not limited. In this regard, as part of establishing a communication between the UE 114 and a serving RAN cell 108, 110, 112, a downlink control channel, a downlink data channel, an uplink control channel, and an uplink data channel are established. In LTE, a physical downlink control channel is known as a PDCCH, a physical downlink data channel is known as a PDSCH, a physical uplink control channel is known as a PUCCH, and a physical uplink data channel is known as a PUSCH. These channels are used to transmit information originating above the PHY layer. The UE 114 transmits uplink control information to a serving RAN cell 108, 110, 112 over a PUCCH 302 (step 304), and uplink data information to a serving RAN cell 108, 110, 112 over a PUSCH 306 (step 308). For closed-loop power control (CLPC) of the PUCCH 302, the serving RAN cell 108, 110, 112 monitors the SNR or SINR (referred to below as "SNR") of the communications signals received on the PUCCH 302 from the UE 114 and compares such with a desired, target SNR or SINR to determine the uplink channel quality of the PUCCH 302. When the received SNR or SINR on the PUCCH 302 from the UE 114 is below the desired target SNR or SINR, a transmit power control message(s) 310 (for LTE, a transmit power control (TPC) command also referred to as "TPC command 310") is transmitted on a PDCCH 312 to the UE 114 to request an increase in the transmit power of the UE 114 (step 314). Otherwise, the transmit power control message(s) 310 will request for a decrease in transmit power of the UE 114.

The TPC commands 310 sent by the serving RAN cell 108, 110, 112 to the UE 114 to adjust the PUCCH 302 power can be determined by the serving RAN cell 108, 110, 112 based on the difference between measured SNR or SINR of periodic channel quality indication (CQI) reports 316 received from the UE 114 on the PUCCH 302 and a desired PUCCH-specific target SNR or SINR. These TPC commands 310 can be sent in downlink control information (DCI) format for downlink grants on the PDCCH 312 transmitted by the serving RAN cell 108, 110, 112, even when the UE 114 has no downlink data, so that the serving RAN cell 108, 110, 112 can receive the periodic CQI reports 316 with a high level of reliability.

TPC commands in LTE are received over the PDCCH in one of at least two formats. In the first format, a TPC command is received in a scheduling grant from the serving RAN cell 108, 110, 112. In this format, the TPC command may take on values of either [−1, 0, 1, 3] dB, or [−3, −1, 1, 3] dB, depending on semi-static configuration parameters determined by higher layer signaling. In a second format, a TPC command for the mobile terminal is jointly coded with other transmit power control commands on the PDCCH, and may assume values according to one of the following sets, again according to semi-static configuration parameters determined by higher layer signaling: [−1, 1] dB, [−1, 0, 1, 3] dB, or [−3, −1, 1, 3] dB.

The serving RAN cell 108, 110, 112 can monitor the SNR or SINR of the communications signals received on the PUCCH 302 from the UE 114 based on the CQI report 316 communicated on the PUCCH 302 that contains information about the downlink channel quality of the PDCCH 312 being observed by the UE 114. The serving RAN cell 108, 110, 112 can determine the difference between the measured SNR or SINR in periodically received CQI reports 316 for a UE 114 and a PUCCH target SNR or SINR to determine if the transmit power should be increased in the UE 114. The serving RAN cell 108, 110, 112 may determine that the UE 114 has not reached a targeted SNR and will thus instruct the UE 114 to increase power by transmitting "UP" TCP commands 310. If the power limitation situation lasts for a long time, the accumulated power control value may continue to grow without limitation. For as long as the UE 114 is scheduled to transmit with a large bandwidth, or for as long as the path loss remains high, the UE 114 may in fact need the maximum transmit power level. However, if the scheduler changes the bandwidth allocation to a smaller bandwidth, or if the radio propagation conditions change significantly, then the UE's 114 maximum power might be too large, and the received SNR will exceed the target. Although the open-loop component of the power control formula will adjust to the new bandwidth allocation, the accumulated "UP" commands in the closed-loop component may cause a problem. If the accumulated power control value is large, then the UE 114 will continue to transmit at maximum power until the accumulated power control value is reduced through successive "DOWN" TPC commands 310. This might take several sub-frames; during that time the UE 114 will transmit at unnecessarily high power levels, causing interference to other UE 114 transmitter signals and unnecessarily draining the UE's 114 battery.

CLPC for the PUCCH 302 can also interfere with the connected mode Discontinuous Reception (DRX) feature for the UE 114, which would otherwise help conserve battery life of the UE 114. In LTE, DRX involves the UE 114 periodically waking up and monitoring the PDCCH 312 in a signaling idle state (e.g., RRC_Idle in radio resource control (RRH) signaling) to listen to the paging message to know about incoming calls, system information change, and Earthquake and Tsunami Warg Service (ETWS) notification, for example, only at a predetermined period (e.g., every 60 milliseconds (ms) or 100 ms) to reduce the UE's 114 power consumption. Thus, in CLPC, when a UE 114 is at maximum or minimum PUCCH 302 power, and the PUCCH-specific target SNR is still not met, the serving RAN cell 108, 110, 112 may still keep sending the TPC command 310 to the UE 114 to reduce or increase PUCCH 302 transmit power, thus causing the UE 114 to consume additional power, and if powered by a battery, run down.

One method for performing CLPC for the PUCCH 302 in LTE in FIG. 3 involves serving RAN cell 108, 110, 112 using PUSCH power headroom (PHR) reports to compute the downlink path loss and consequently calculate the PUCCH 302 power (which also includes the accumulated effect of previously applied TPC commands 310). This calculated PUCCH 302 power can be used to determine whether TPC commands 310 should be continued to be sent to the UE 114. Using the calculated PUCCH 302 power, the serving RAN cell 108, 110, 112 can decide if the next TPC command 310 should be sent to the UE 114. If it is determined that accumulated effect on PUCCH 302 power from the previously sent TPC commands 310 is no longer causing the PUCCH 302 power to vary beyond a defined variance threshold, the serving RAN cell 108, 110, 112 can choose to not send a new TPC command 310, which would cause the UE 114 to consume additional power processing and may, for example, interfere with the connected mode DRX feature for the UE 114. However, this method involves the full calculation of receive power as defined in 3GPP standard 36.213-sub-clause 5.1.2, which involves several other variables, and as a result of that, is complex and prone to estimation errors. This is shown in the power control formula to calculate the power that the UE 114 transmits on the PUCCH 302 in LIE shown in FIG. 4, as an example. As shown therein, the power control formula $P_{PUCCH(j)}$ for the PUCCH in LTE can be broken into four key parts (1)-(4). The first part (1) is called $P_{0\text{-}PUCCH}$. It is the assumed interference that the UE 114 is expected to overcome. $P_{0\text{-}PUCCH}$ is composed of two subcomponents. The first is called $P_{0\_Nominal\_PUCCH}$ and it is communicated over SIB2. It is valid for all UEs 114 in the serving RAN cell 108, 110, 112. The second component is called $P_{0\_UE\_PUCCH}$ and it is a UE-specific value that is optional. The second part (2) is the Path Loss (PL) and the impact of the PL. The third part (3) is $\Delta_{F\_PUCCH}(F)$ and is a MCS-specific component. If the serving RAN cell 108, 110, 112 wants the UE 114 to adjust its power based on the MCS that is assigned, it will be taken into account here. The fourth part is g(i) value, which is simply the closed-loop feedback. This is the additional power the UE 114 will add to the transmission based on specific feedback by the serving RAN cell 108, 110, 112. This value is different for each format type of the PUCCH.

Figure 5:
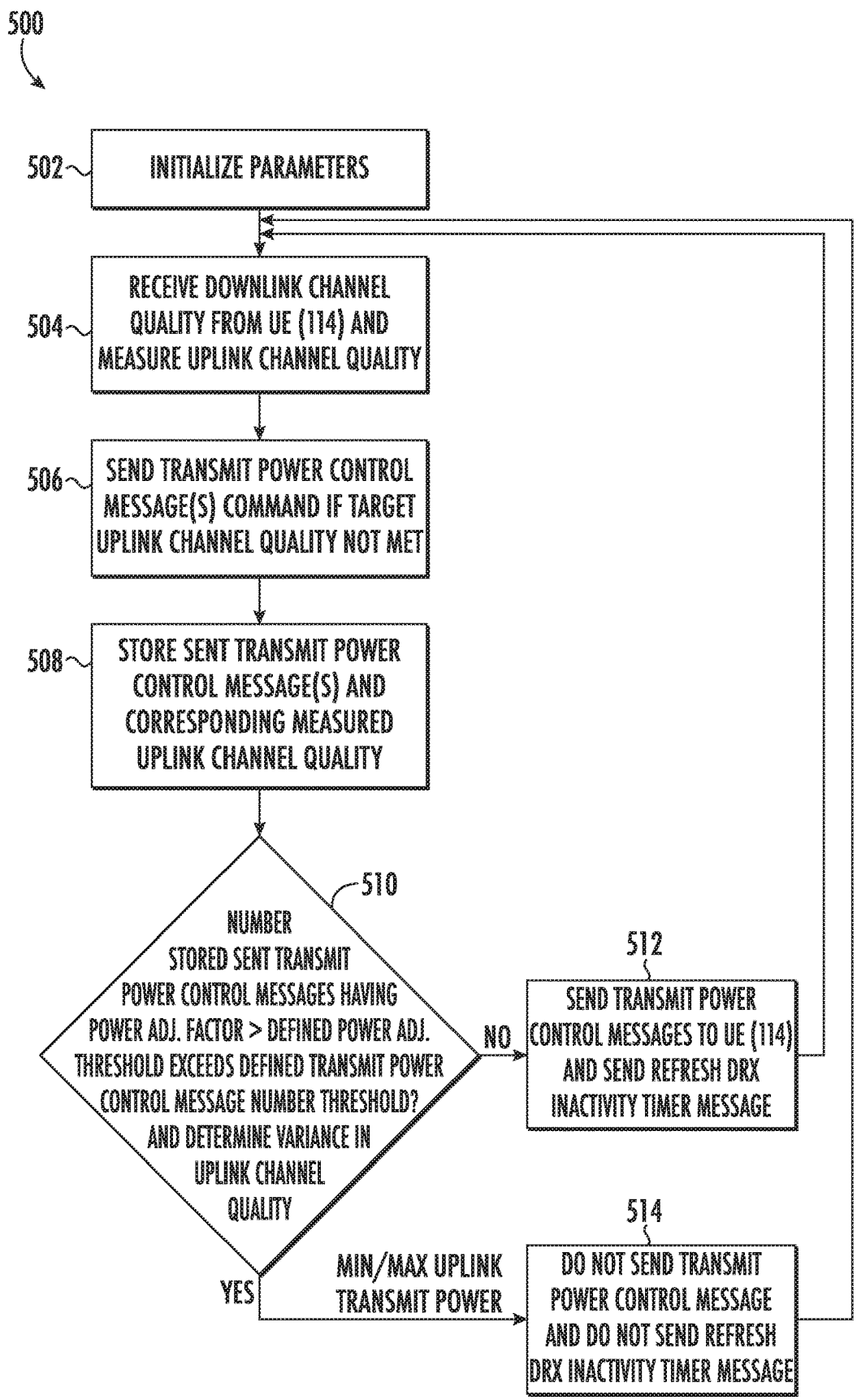
FIG. 5 is a flowchart illustrating an exemplary process of the RAN cell performing a closed-loop power control process employing selective control of transmit power control messages to the UE to control uplink control channel power based on variation in uplink control channel signal quality.

To avoid the serving RAN cell 108, 110, 112 continuously sending transmit power control messages (e.g., the TPC commands 310 in FIG. 3) that may not be effective in further adjusting the uplink control channel (e.g., PUCCH 302) transmit power of the UE 114, and without having to calculate the actual uplink control channel power, the serving RAN cell 108, 110, 112 can be configured to indirectly measure the uplink control channel power by reviewing the received uplink control channel quality (e.g., SNR or SINR) in a report communicated from the UE 114 to the serving RAN cell 108, 110, 112. In this regard, FIG. 5 is a flowchart illustrating an exemplary process 500 that can be employed by the serving RAN cells 108, 110, 112 in FIGS. 1-3 for performing a CLPC employing selective control of transmit power control messages to the UE 114 to control uplink control channel power based on variation in uplink control channel signal quality. As shown therein, a first step of this process involves the serving RAN cell 108, 110, 112 initialing the parameters that will be used to determine the uplink control channel signal quality (e.g., SNR) (block 502 in FIG. 5). A next step involves the serving RAN cell 108, 110, 112 receiving on the uplink control channel 302, a downlink channel quality of a downlink channel measured by the UE 114 (block 504 in FIG. 5). For example, the downlink channel quality of the downlink channel may be a SNR of the downlink channel. For example, for LTE, with reference to FIG. 3, this can involve receiving the CQI reports 316 on the PUCCH 302 from the UE 114. A next step involves the serving RAN cell 108, 110, 112 measuring the uplink channel quality of the uplink channel based on the received downlink channel quality (block 504 in FIG. 5), For example, for LTE, with reference to FIG. 3, this can involve measuring the SNR of the PUCCH 302 based on the received CQI reports 316.

With continuing reference to FIG. 5, the serving RAN cell 108, 110, 112 can next determine if the measured uplink channel quality does not meet (i.e., is less than) a desired, target uplink channel quality (block 506 in FIG. 5). For example, this can involve the serving RAN cell 108, 110, 112 determining if the measured PUCCH 302 SNR from the CQI reports 316 does not meet (i.e., is less than) a desired, target uplink control channel SNR. If the measured uplink channel quality does not meet (i.e., is less than) a desired, target uplink channel quality, the serving RAN cell 108, 110, 112 creates (but does not yet send) a transmit power control message(s) comprising a power adjustment indicator to be sent to the UE 114 to cause the UE 114 to adjust its transmit power based on the power adjustment indicator. For example, this can involve the serving RAN cell 108, 110, 112 determining if the measured PUCCH 302 SNR from the CQI reports 316 does not meet (i.e., is less than) a desired, target uplink control channel SNR shown in FIG. 3. If the measured uplink channel quality does not meet (i.e., is less than) a desired, target uplink channel quality, the serving RAN cell 108, 110, 112 creates and sends a transmit power control message(s) to the UE 114 (block 506 in FIG. 5). For example, this can involve the serving RAN cell 108, 110, 112 creating a TPC command 310 to send to the UE 114 shown in FIG. 3. The serving RAN cell 108, 110, 112 is configured to store the sent transmit power control message(s) and the measured uplink channel quality corresponding to the sent transmit power control message(s) (block 508 in FIG. 5). For example, this can involve the serving RAN cell 108, 110, 112 storing the sent TPC command(s) 310 and the measured PUCCH 302 SNR corresponding to the sent TPC command(s). This is so that the serving RAN cell 108, 110, 112 has a record of the previously sent transmit power control message(s) to be able to judge the effectiveness of such on the UE 114 adjusting its uplink transmit power to avoid unnecessarily sending additional transmit power control message(s) if such would not be effective. In one example, TPC commands 310 sent using DCI 1/1a/2/2a/2b are only stored by the serving RAN cell 108, 110, 112 after confirming that the UE 114 has received and applied the TPC command 310 (e.g., after the serving RAN cell 108, 110, 112 receives the HARQ ACK for the sent TPC command 310).

With continuing reference to FIG. 5, serving RAN cell 108, 110, 112 can next determine if a number of stored sent transmit power control messages having a corresponding power adjustment factor greater than a defined power adjustment threshold exceeds a defined transmit power control message number threshold (block 510 in FIG. 5). For example, the serving RAN cell 108, 110, 112 can next determine if a number of stored sent transmit power control messages having a corresponding power adjustment factor greater than a defined power adjustment threshold exceeds a defined transmit power control message number threshold. For example, this can involve determining if the number of consecutive, identical non-zero TPC commands 310 does not vary by more than a defined number of transmit power control messages. This is to determine if the transmit power commands are not varying, because a lack in variance in the transmit power commands may mean that such transmit power commands are not effective in causing the UE 114 to change its uplink channel power. This may be an indication that the uplink channel power is already at a maximum or minimum power level, wherein sending new transmit power control messages to the UE 114, to increase or decrease, respectively, uplink channel power would be ineffective. If the number of stored sent transmit power control messages having the corresponding power adjustment factor not greater than the defined power adjustment threshold exceeds the defined transmit power control message number threshold, the serving RAN cell 108, 110, 112 sends the transmit power control message to the UE 114 (block 512). This involves, for example, the serving RAN cell 108, 110, 112 sending the TPC command 310 to the UE 114. The serving RAN cell 108, 110, 112 may also send a refresh discontinuous reception (DRX) inactivity timer message to the UE 114 to cause the UE 114 to reset its timer to wake up. If, however, the number of stored sent transmit power control messages having the corresponding power adjustment factor greater than the defined power adjustment threshold exceeds the defined transmit power control message number threshold, the serving RAN cell 108, 110, 112 can additionally determine a variance in the uplink channel quality (block 510 in FIG. 5). For example, this can involve determining a variance in the measured SNR of the PUCCH 302. If the serving RAN cell 108, 110, 112 determines that variance in the uplink channel quality of the uplink channel does exceed a defined uplink channel quality variance threshold, this means sending the transmit power control message may ineffective, and thus, the serving RAN cell 108, 110, 112 may be configured to not send a transmit power control message. For example, this may indicate that the PUCCH 302 power, for example, it already at a maximum or minimum power level. Thus, the serving RAN cell 108, 110, 112 does not send the transmit power control message to the UE 114 (block 514). The serving RAN cell 108, 110, 112 may also not send a refresh DRX inactivity timer message to the UE 114 to not cause the UE 114 to reset its wake up timer since no transmit power control message will be sent.

As another example, in block 510 in FIG. 5, the serving RAN cell 108, 110, 112 may be configured to determine if number of the latest 'N' consecutive identical, non-zero TPC commands 310 exceeds a defined transmit power control message number threshold. If so, the serving RAN cell 108, 110, 112 can measure the effectiveness of the SINR commands in the CQI reports 316. That can be done, for example, by calculating an average uplink channel SINR over the last 'N' entries of stored TPC commands 310 (see block 508 in FIG. 5) according to formula (1) below:

$$Avg.\ SINR = \frac{1}{N}\sum_{i=0}^{N-1} SINR_i \quad (1)$$

where:
$SINR_i$ represents the $i^{th}$ instantaneous SINR entry in the SINR list.

Then, the serving RAN cell 108, 110, 112 can determine the mean absolute deviation (MAD) in the uplink channel quality (i.e., a variance in uplink channel quality) of the last 'N' TPC commands 310 stored, according to formula (2) below:

$$MAD = \frac{1}{N}\sum_{i=0}^{N-1} |SINR_i - Avg.\ SINR| \quad (2)$$

where:
SINR represents the $i^{th}$ instantaneous SINR entry in the SINR list; and
|•| is the absolute-value operator.

The MAD can be compared with the parameter Δ (i.e., a uplink channel quality variance threshold). The TPC commands 310 can be determined to be ineffective and thus not sent by the serving RAN cell 108, 110, 112 if MAD is ≤Δ. In an experiment, with N=5 and Δ=0.4 dB, logs at UE 114 indicated that TPC commands 310 are ineffective when a UE 114 has reached its maximum or minimum transmit power. If the above is true when TPC commands 310 of "−1" were communicated to the UE 114, a "min-tx-power-reached" flag is raised, meaning that since the uplink channel SINR is not decreasing further in spite of consecutive "−1" TPC commands 310, for example, the UE 114 has reached its minimum transmit power. On the other hand, for consecutive TPC commands 310 of "1" or "3" for example, the "max-tx-power-reached" flag is raised in the UE 114, meaning that the UE 114 has reached its maximum transmit power. For such events, the serving RAN cell 108, 110, 112 cannot send TPC commands 310 until the TPC commands 310 (based on measured SINR of incoming periodic CQI reports) change and/or the MAD≥Δ. In this case, the process in FIG. 5 restarts after 'N' consecutive, identical non-zero TPC commands 310 are collected in block 510. Following that, the process is repeated in blocks 510-514 in FIG. 5.

Figure 6:
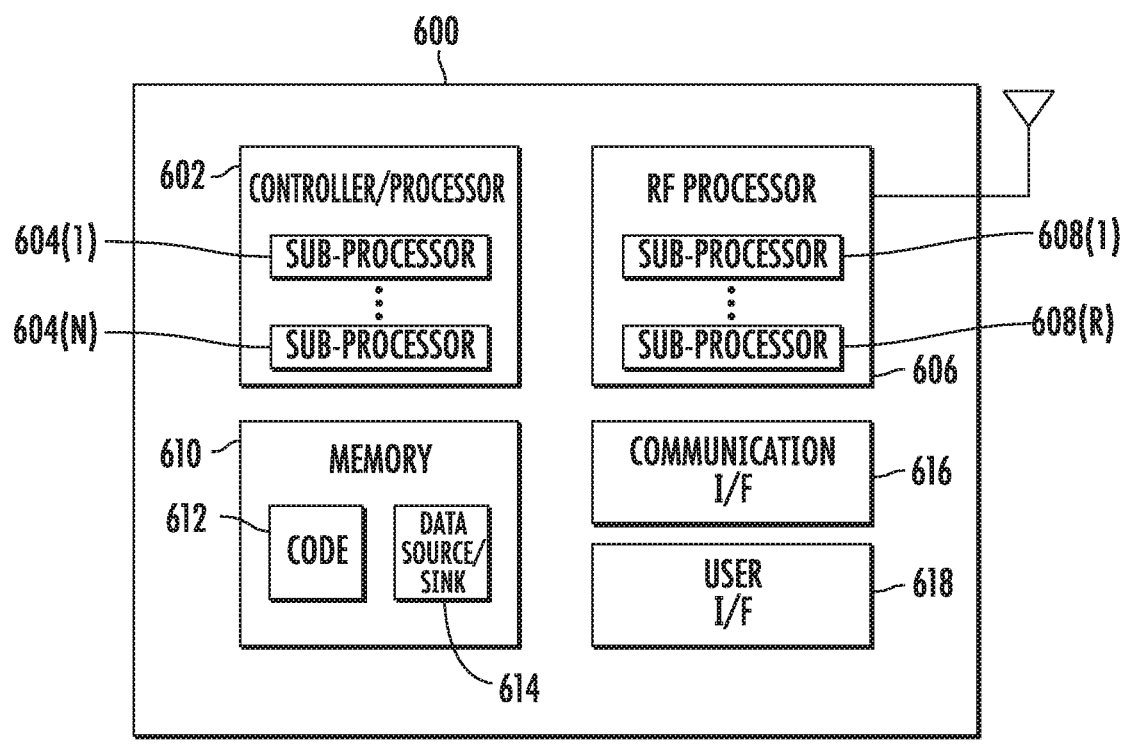
FIG. 6 is a schematic diagram of an exemplary computer system that can be implemented for a radio cell of a RAN or a user mobile communications device that may be configured to selectively control transmit power control messages communicated from a RAN cell to UE based on effectiveness in closed-loop power control for an uplink control channel, wherein the computer system is adapted to execute instructions from an exemplary computer readable link.

FIG. 6 shows a simplified functional block diagram 600 of an illustrative computer system for a RAN cell, including the MNO macrocells 108(1)-108(M), the shared spectrum cell 110, and/or small RAN cells 112(1)-112(C) with small cells, and/or a UE 114(1)-114(N) in FIG. 1 that can be configured to selectively control transmit power of a UE based on the effectiveness in such transmit power control changing the uplink control channel signal quality, and according to any of the examples discussed above. A controller circuit/processor 602 typically handles high level processing. The controller circuit/processor 602 may include one or more sub-processors 604(1)-604(N) or cores that are configured to handle specific tasks or functions. An RF processor 606 implements various signal processing functions for the downlink including the lower level L1 processing. The RF processor 606 may include one or more sub-processors 608(1)-608(R) or cores that are configured to handle specific tasks or functions. A memory 610 is a computer-readable medium that stores computer-readable code 612 that is executable by one or more processors including the controller circuit/processor 602 and/or the RF processor 606. The memory 610 may also include various data sources and data sinks (collectively represented by element 614) that may provide additional functionalities.

The code 612 in typical deployments is arranged to be executed by the one or more processors to facilitate the discovery of a neighboring radio access system or cells reporting to a serving RAN. The code 612 additionally enables implementation of both the dedicated PCI identity and common PCI identity using the same hardware infrastructure in a given dual identity cell when executed. The hardware infrastructure may also include various interfaces (I/Fs) including a communication I/F 616 which may be used, for example, to implement a link to the services node 116 (FIG. 1), LAN, or to an external processor, control, or data source. In some cases, a user I/F 618 may be utilized to provide various indications such as power status or to enable some local control of features or settings. It is noted that the block diagram 600 may also be substantially applicable to a services node 116, MNO macrocells 108(1)-108(M), shared spectrum cell 110, small RAN cells 112(1)-112(C) and/or the UEs 114(1)-114(N). More particularly, the RF processor 606 may be eliminated in some applications and any functionality that it provides that is needed to implement the services node 116 may be provided by the controller circuit/processor 602.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller circuit, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A radio access network (RAN) cell, comprising:
a transmitter circuit configured to transmit a communications signal on a downlink channel to a user equipment (UE);
a receiver circuit configured to receive communications signals on an uplink channel from the UE; and
a controller circuit communicatively coupled to the transmitter circuit and the receiver circuit, the controller circuit configured to:
receive on the uplink channel, a downlink channel quality of the downlink channel measured by the UE;
measure an uplink channel quality of the uplink channel based on the received downlink channel quality;
in response to the measured uplink channel quality being less than a target uplink channel quality:
create a transmit power control message comprising a power adjustment indicator to be sent to the UE to adjust its transmit power based on the power adjustment indicator; and store the transmit power control message and the measured uplink channel quality corresponding to the sent transmit power control message;

determine if a number of stored sent transmit power control messages having a corresponding power adjustment factor greater than a defined power adjustment threshold exceeds a defined transmit power control message number threshold; and in response to the number of stored sent transmit power control messages having the corresponding power adjustment factor greater than the defined power adjustment threshold exceeding the defined transmit power control message number threshold:

determine a variance in the uplink channel quality of the uplink channel based on the measured uplink channel quality;

determine if the variance in the uplink channel quality of the uplink channel exceeds a defined uplink channel quality variance threshold; and in response to the variance in the uplink channel quality of the uplink channel not exceeding the defined uplink channel quality variance threshold, not send the transmit power control message to the UE.

2. The RAN cell of claim 1, wherein the controller circuit is further configured to, in response to the variance in the uplink channel quality of the uplink channel not exceeding the defined uplink channel quality variance threshold, not send a refresh discontinuous reception inactivity timer message to the UE.

3. The RAN cell of claim 1, wherein the controller circuit is further configured to send the transmit power control message to the UE, in response to the number of stored sent transmit power control messages having the corresponding power adjustment factor less than the defined power adjustment threshold exceeding the defined transmit power control message number threshold.

4. The RAN cell of claim 3, wherein the controller circuit is further configured to send a refresh discontinuous reception inactivity timer message to the UE, in response to the number of stored sent transmit power control messages having the corresponding power adjustment factor less than the defined power adjustment threshold exceeding the defined transmit power control message number threshold.

5. The RAN cell of claim 1, wherein the controller circuit is further configured to send the transmit power control message to the UE, in response to the variance in the uplink channel quality of the uplink channel exceeding the defined uplink channel quality variance threshold.

6. The RAN cell of claim 5, wherein the controller circuit is further configured to send a refresh discontinuous reception inactivity timer message to the UE, in response to the variance in the uplink channel quality of the uplink channel exceeding the defined uplink channel quality variance threshold.

7. The RAN cell of claim 1, wherein:
the downlink channel quality of the downlink channel comprises a signal-to-noise ratio (SNR) of the downlink channel; and
the uplink channel quality of the uplink channel comprises an SNR of the uplink channel.

8. The RAN cell of claim 7, wherein the controller circuit is configured to determine the variance in the uplink channel quality of the uplink channel based on the measured uplink channel quality by being configured to:

determine an average SNR of the uplink channel based on the SNRs of the uplink channel corresponding to the transmit power control messages; and determine a mean absolute deviation of SNR of the uplink channel based on the determined average SNR of the uplink channel and a last number of average SNRs of the uplink channel as the variance in the uplink channel quality of the uplink channel.

9. The RAN cell of claim 1, wherein the uplink channel comprises an uplink control channel,
the controller circuit configured to receive on the uplink control channel, the downlink channel quality of the downlink channel measured by the UE.

10. The RAN cell of claim 9, wherein the uplink control channel comprises a physical uplink control channel (PUCCH).

11. The RAN cell of claim 1, wherein the downlink channel comprises a downlink control channel;
the controller circuit configured to:
receive on the uplink channel, the downlink channel quality of the downlink control channel measured by the UE; and
measure the uplink channel quality of the uplink channel based on the received downlink channel quality.

12. The RAN cell of claim 11, wherein the downlink control channel comprises a physical downlink control channel (PDCCH).

13. The RAN cell of claim 1, wherein the transmit power control message comprises a transmit power control (TPC) command.

14. The RAN cell of claim 13, wherein the controller circuit is configured to:
determine if the number of stored sent transmit power control messages having the corresponding power adjustment factor greater than the defined power adjustment threshold exceeds the defined transmit power control message number threshold, by being configured to determine if the number of stored sent transmit power control messages having the corresponding power adjustment factor not equal to zero is greater than the defined power adjustment threshold, exceeds the defined transmit power control message number threshold; and in response to the number of stored sent transmit power control messages having the corresponding power adjustment factor not equal to zero being greater than the defined power adjustment threshold exceeding the defined transmit power control message number threshold:

determine the variance in the uplink channel quality of the uplink channel based on the measured uplink channel quality;

determine if the variance in the uplink channel quality of the uplink channel exceeds the defined uplink channel quality variance threshold; and in response to the variance in the uplink channel quality of the uplink channel not exceeding the defined uplink channel quality variance threshold, not sending the transmit power control message to the UE.

15. A method of controlling transmit power of user equipment (UE) in communication with a radio access network (RAN) cell, comprising:

receiving on an uplink channel, a downlink channel quality of a downlink channel measured by a UE;

measuring an uplink channel quality of uplink channel based on the received downlink channel quality;

in response to the measured uplink channel quality being less than a target uplink channel quality:
  creating a transmit power control message comprising a power adjustment indicator to be sent to the UE to adjust its transmit power based on the power adjustment indicator; and
  storing the transmit power control message and the measured uplink channel quality corresponding to the sent transmit power control message;
determining if a number of stored sent transmit power control messages having a corresponding power adjustment factor greater than a defined power adjustment threshold exceeds a defined transmit power control message number threshold; and
in response to the number of stored sent transmit power control messages having the corresponding power adjustment factor greater than the defined power adjustment threshold exceeding the defined transmit power control message number threshold:
  determining a variance in the uplink channel quality of the uplink channel based on the measured uplink channel quality;
  determining if the variance in the uplink channel quality of the uplink channel exceeds a defined uplink channel quality variance threshold; and
  in response to the variance in the uplink channel quality of the uplink channel not exceeding the defined uplink channel quality variance threshold, not sending the transmit power control message to the UE.

16. The method claim 15, wherein, in response to the variance in the uplink channel quality of the uplink channel not exceeding the defined uplink channel quality variance threshold, not sending a refresh discontinuous reception inactivity timer message to the UE.

17. The method of claim 15, further comprising sending the transmit power control message to the UE, in response to the number of stored sent transmit power control messages having the corresponding power adjustment factor less than the defined power adjustment threshold exceeding the defined transmit power control message number threshold.

18. The method of claim 17, further comprising sending a refresh discontinuous reception inactivity timer message to the UE, in response to the number of stored sent transmit power control messages having the corresponding power adjustment factor less than the defined power adjustment threshold exceeding the defined transmit power control message number threshold.

19. The method of claim 15, further comprising sending the transmit power control message to the UE, in response to the variance in the uplink channel quality of the uplink channel exceeding the defined uplink channel quality variance threshold.

20. The method of claim 19, further comprising sending a refresh discontinuous reception inactivity timer message to the UE, in response to the variance in the uplink channel quality of the uplink channel exceeding the defined uplink channel quality variance threshold.

21. The method of claim 15, wherein:
  the downlink channel quality of the downlink channel comprises a signal-to-noise ratio (SNR) of the downlink channel; and
  the uplink channel quality of the uplink channel comprises an SNR of the uplink channel.

22. The method of claim 21, wherein determining the variance in the uplink channel quality of the uplink channel based on the measured uplink channel quality comprises:
  determining an average SNR of the uplink channel based on the SNRs of the uplink channel corresponding to the transmit power control messages; and
  determining a mean absolute deviation of SNR of the uplink channel based on the determined average SNR of the uplink channel and a last number of average SNRs of the uplink channel as the variance in the uplink channel quality of the uplink channel.

23. A non-transitory computer-readable medium having stored thereon computer executable instructions which, when executed, cause a processor associated with a radio access network (RAN) cell to:
  receive on an uplink channel, a downlink channel quality of a downlink channel measured by a user equipment (UE);
  measure an uplink channel quality of the uplink channel based on the received downlink quality;
  in response to the measured uplink channel quality being less than a target uplink channel quality:
    create a transmit power control message comprising a power adjustment indicator to be sent to the UE to adjust its transmit power based on the power adjustment indicator; and
    store the transmit power control message and the measured uplink channel quality corresponding to the sent transmit power control message;
  determine if a number of stored sent transmit power control messages having a corresponding power adjustment factor greater than a defined power adjustment threshold exceeds a defined transmit power control message number threshold; and
  in response to the number of stored sent transmit power control messages having the corresponding power adjustment factor greater than the defined power adjustment threshold exceeding the defined transmit power control message number threshold:
    determine a variance in the uplink channel quality of the uplink channel based on the measured uplink channel quality;
    determine if the variance in uplink channel quality of the uplink channel exceeds a defined uplink channel quality variance threshold; and
    in response to the variance in the uplink channel quality of the uplink channel not exceeding the defined uplink channel quality variance threshold, not send the transmit power control message to the UE.

24. The non-transitory computer-readable medium of claim 23, wherein the instructions which, when executed, further cause the processor associated with the RAN cell to send the transmit power control message to the UE, in response to the number of stored sent transmit power control messages having the corresponding power adjustment factor less than the defined power adjustment threshold exceeding the defined transmit power control message number threshold.

25. The non-transitory computer-readable medium of claim 23, wherein the instructions which, when executed, cause the processor associated with the RAN cell to send the transmit power control message to the UE, in response to the variance in the uplink channel quality of the uplink channel exceeding the defined uplink channel quality variance threshold.

* * * * *

UNITED STATES PATENT AND TRADEMARK OFFICE
CERTIFICATE OF CORRECTION

PATENT NO. : 10,912,030 B2
APPLICATION NO. : 16/293950
DATED : February 2, 2021
INVENTOR(S) : Vandana Chhabra et al.

It is certified that error appears in the above-identified patent and that said Letters Patent is hereby corrected as shown below:

In the Claims

In Column 21, Line 30, Claim 16, after "The method" insert -- of --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*